April 11, 1939.  C. SIMEK  2,154,316
MACHINE FOR COUNTING VOTES
Original Filed July 28, 1928  7 Sheets-Sheet 1

INVENTOR.
Charles Simek
BY Ferd Bing
ATTORNEY

April 11, 1939. C. SIMEK 2,154,316
MACHINE FOR COUNTING VOTES
Original Filed July 28, 1928 7 Sheets-Sheet 4

INVENTOR.
Charles Simek
BY Fred Bing
ATTORNEY

April 11, 1939.   C. SIMEK   2,154,316

MACHINE FOR COUNTING VOTES

Original Filed July 28, 1928   7 Sheets-Sheet 5

INVENTOR.
Charles Simek
BY Ferd Bing
ATTORNEY

April 11, 1939.  C. SIMEK  2,154,316
MACHINE FOR COUNTING VOTES
Original Filed July 28, 1928  7 Sheets-Sheet 6

April 11, 1939.  C. SIMEK  2,154,316
MACHINE FOR COUNTING VOTES
Original Filed July 28, 1928  7 Sheets-Sheet 7

INVENTOR.
Charles Simek
BY
Ferd Bing
ATTORNEY

Patented Apr. 11, 1939

2,154,316

UNITED STATES PATENT OFFICE 2,154,316

MACHINE FOR COUNTING VOTES

Charles Simek, Chicago, Ill.

Original application July 28, 1928, Serial No. 295,860. Divided and this application September 20, 1934, Serial No. 744,867

5 Claims. (Cl. 235—56)

The invention relates generally to a machine for automatically counting votes and more particularly it relates to a machine which is adapted simultaneously to count a plurality of votes which have been cast or indicated upon a particular ballot.

Heretofore it has been customary in voting to indicate the selection of candidates by making marks upon the surface of the ballot and in order to determine the total number of votes cast for each candidate it has been necessary to examine each ballot and call off the names of the candidates indicated so that the votes may be entered upon a talley sheet by the clerks under the names of the candidates for whom the votes were cast.

It is of course well known that this system lends itself to the commission of many fraudulent acts and it is the general object of the present invention to provide a device by which the voter's selection of candidates may be taken mechanically from the original ballot and these votes introduced mechanically into a counting mechanism which will indicate the number of votes cast for each individual candidate on the ballot.

Another object is to provide a machine having a plurality of separate counting mechanisms, one for each candidate or proposition to be voted upon, together with new and improved means for transmitting an actuating power impulse to said counting mechanisms in accordance with physical indicia such as alterations placed upon a ballot by a voter.

Another object is to provide such a machine having automatically operable means of an improved character for positioning ballots in the machine one at a time so that the votes indicated thereon may be counted by said machine.

Another object is to provide such a mechanism having a safety device thereon operable to prevent actuation of the counting mechanism in case a ballot becomes improperly positioned in the machine or in case the supply of ballots to be counted has become exhaused.

Another object is to provide such a device having a number of mechanisms at which actuating power impulses may be taken from the ballots and these actuating impulses from the plurality of stations introduced into a device having a single counter for each candidate or proposition.

Other objects and advantages will become apparent from the following description taken in connection with the accompanying drawings in which:

Fig. 1ᵃ is a fragmentary side elevational view of the machine which is shown in Fig. 1 and when taken together with Fig. 1 forms a complete side elevation of the machine.

Fig. 2ᵃ is a fragmentary plan view of that portion of the machine shown in Fig. 1ᵃ.

Fig. 3ᵃ is an enlarged fragmental portion of the upper right hand end of Fig. 1ᵃ.

Fig. 3ᵇ is an enlarged fragmental portion of Fig. 3.

Fig. 8 is an elevational view of the card handling member 17, one portion being broken away to show the interior construction thereof.

Fig. 22 is a plan section through the cylinder block 144 which is shown in Fig. 18.

Figs. 23 and 24 are side elevational views of the gears used in the counting device.

While I have shown in the accompanying drawings and will herein describe in detail the preferred embodiment of the invention together with one alternative embodiment thereof, it is to be understood that this disclosure is given for the purpose of illustrating the invention and is not intended as a limitation of the invention to the construction disclosed. In the appended claims, I am to cover all modifications and alternative constructions falling within the scope of the invention as limited by the state of the prior art.

General description

It is believed that a general description of the principal parts of the device as embodied herein together with a general description of the relation of these parts to each other will lead to a better understanding of the operation of the device as a whole.

Figure 1:
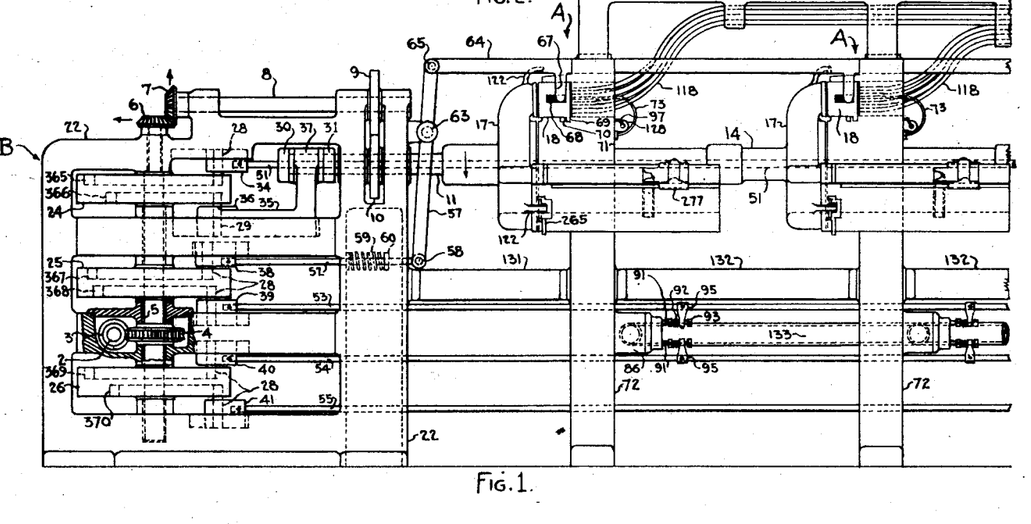
Figure 1 is a fragmentary side elevational view partially in section of a machine embodying the preferred form of the invention.
Figure 2:
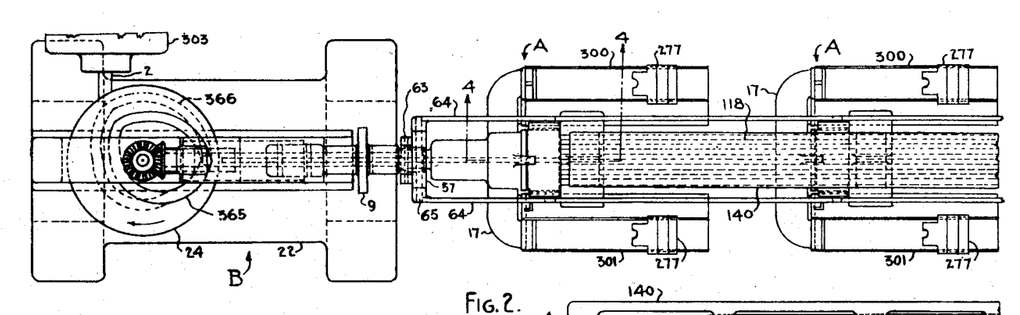
Fig. 2 is a plan view of the portion of the machine shown in Fig. 1.
Figure 2A:
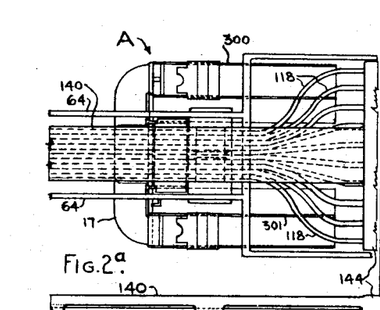

In the preferred form of the invention illustrated herein, I provide a plurality of ballot handling mechanisms or devices designated generally as A in Figs. 1, 1ª, 2 and 2ª, these ballot handling mechanisms being arranged in series so as to be actuated and controlled by a single motor operated device designated generally by the letter B in Figs. 1 and 2. The ballot handling devices A are operated so that the ballots supplied to each of the handling devices A are presented one at a time to a position wherein actuating power impulses are released by the alterations of the ballot which have been made by the voter and from which position these impulses are communicated to a single counting mechanism designated generally by the letter C.

The ballot or vote card

Figures 33, 34, 35, 36, 37, 38, 39, 40, 41:
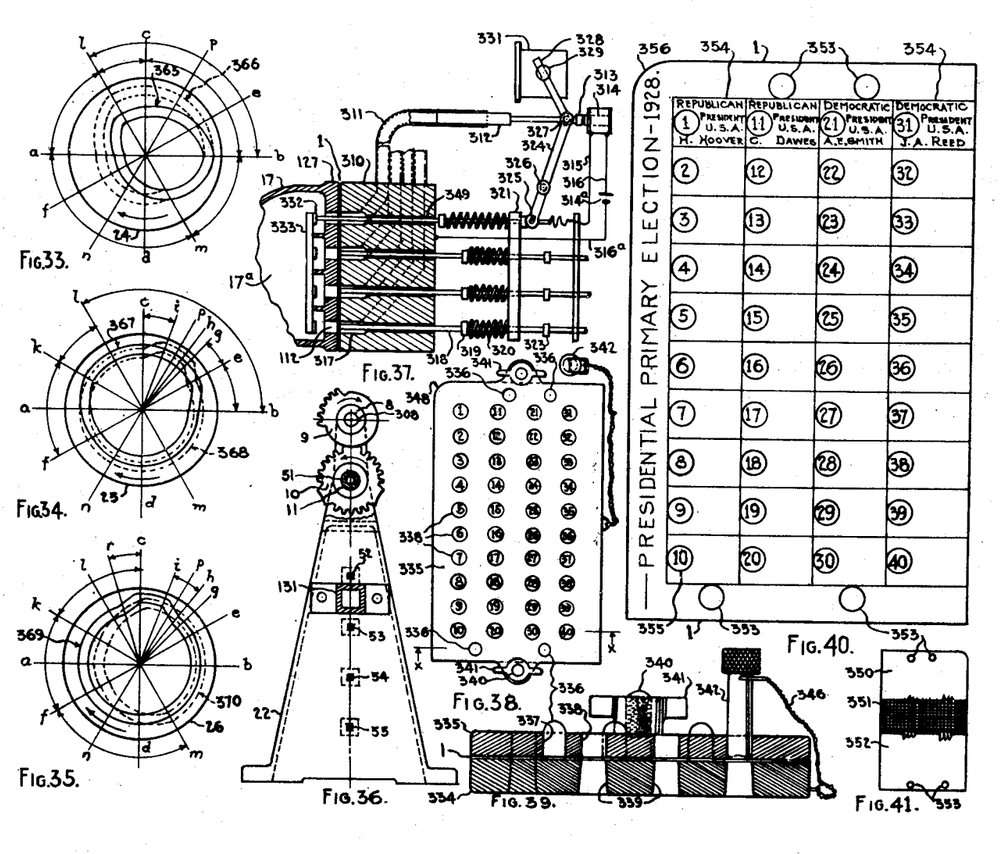
Figs. 33 to 35 are detail views showing the cam disks 24, 25, 26 respectively.
Fig. 36 is an end elevational view partially in section of the intermittent gearing used to drive the hollow shaft 14.
Fig. 37 is a view showing an alternative construction which may be used.
Figs. 38 and 39 are detail views of the voting block which is used to punch holes in the ballots 1 at the desired points.
Figs. 40 and 41 are detail views of the vote card or ballot 1.

The invention contemplates that with the particular vote counting machine illustrated herein, a comparatively small ballot will be used, such for example as shown in detail in Figs. 40 and 41. These small ballots or vote cards are preferable for the reason that they may be made of relatively heavy material so as to be adapted for rapid handling by the machine.

The ballot or vote card which is generally designated by the numeral 1 in Fig. 40 is preferably made up of a layer 351 of cloth fixed between two layers 350, 352 of paper. The vote card 1 is in the present instance divided into a plurality of spaces 354 in each of which spaces a vote may be indicated by the elector.

Means for marking the ballots

In the preferred form of the invention the preference or vote of the elector is marked upon the ballot by making a physical alteration in the particular space 354 which has been assigned to the particular candidate for whom the elector wishes to vote and to facilitate the proper marking of the vote card 1, a voting block is provided which is shown in detail in Figs. 38 and 39. The voting block in its preferred form comprises a lower section 334 and an upper section 335, the lower section 334 having thereon a plurality of upwardly projecting pins 336 adapted to enter apertures 337 in the upper section 335 so that apertures 338 formed in the upper section 335 will be properly alined with apertures 339 formed in the lower section of the block. The pins 336 may also serve to properly position the voting card between the upper and lower sections of the block and to this end apertures 353 are formed in the vote cards 1 to be engaged by the pins 336. In order that the vote card 1 may be invariably positioned properly, the pins 336 and the apertures 353 are unsymmetrically positioned on the block and on the card respectively.

In the present instance I have also provided a rounded corner 356 on the vote card 1 which may be matched with a rounded corner 348 formed on the voting block. This serves as an additional check on the proper positioning of the vote card.

To secure the two sections of the block together screws 340 are positioned on the lower block with suitable winged nuts 341 thereon to engage lugs formed on the upper section 335 of the block. A punch 342 is provided which may be secured to the block as by means of a chain 346. The punch 342 is made substantially the same size as the apertures 338 and 339 so that the punch may be inserted in the apertures to shear holes in the vote card 1 at the desired points to indicate the voter's selection of candidates.

After the indicia have been placed upon the voting cards by the electors the cards are gathered together to be placed in the counting machine which will be now described in detail.

The actuating and controlling mechanism B

The actuating and controlling mechanism designated generally by the letter B in Figs. 1 and 2 comprises a shaft 5 which is in the present instance vertically mounted in a frame 22 and which is driven by a motor 303 having a shaft 2 arranged to drive the shaft 5 through a worm 3 fixed on a shaft 2 and engaging a worm wheel 4 on the shaft 5. The shaft 5 is arranged through the medium of various independent connecting means to actuate the various parts of the ballot handling and counting mechanisms in the proper sequence.

The ballot handling mechanism A

Figures 4, 5, 6, 7:
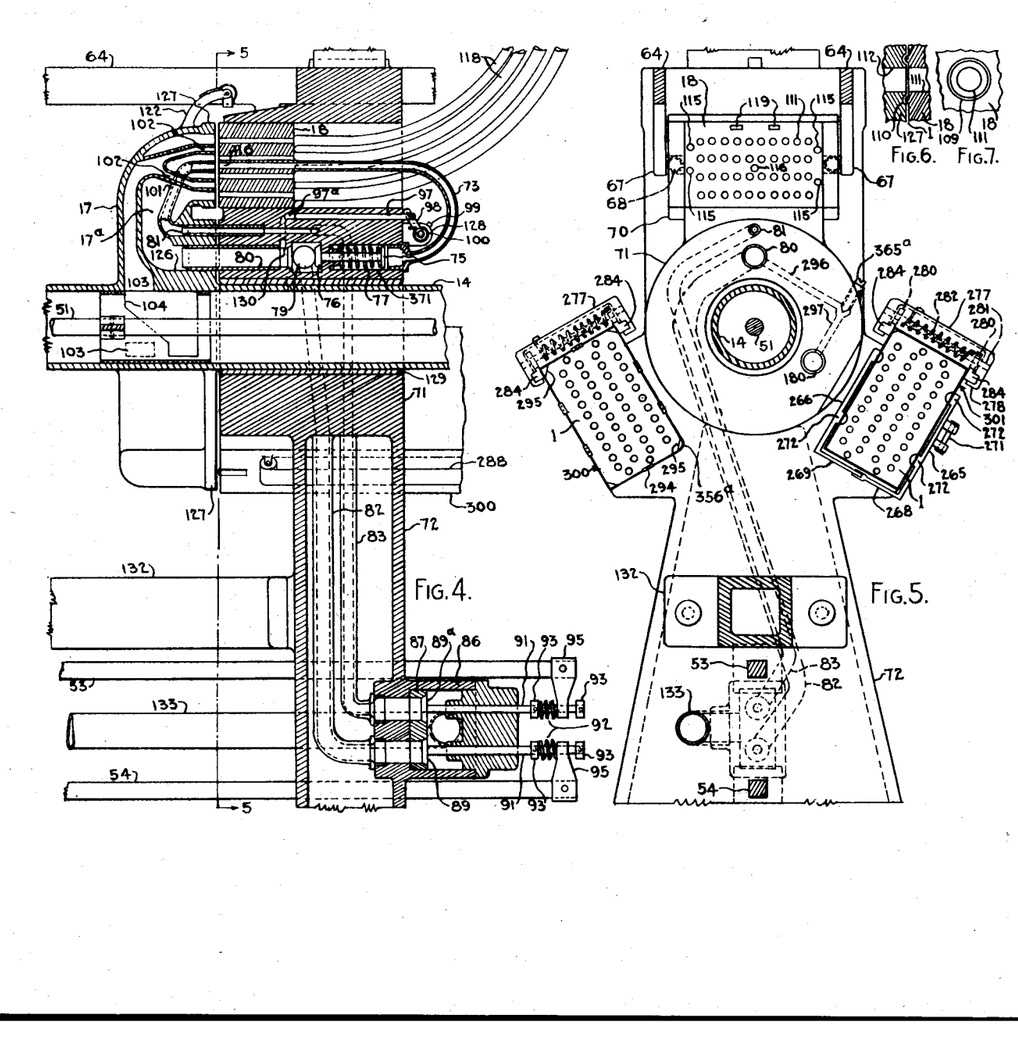
Fig. 4 is a fragmentary vertical sectional view taken along the line 4—4 of Fig. 2.
Fig. 5 is an elevational view of the card handling device, the view being taken partially in section taken in the plane of the line 5—5 of Fig. 4.
Figs. 6 and 7 are detail views of the card face 127 and the register block 18.

In the preferred form of the invention the actuating power impulses are taken or released from the vote cards 1 and transmitted to the counting mechanism C by means of compressed air and means is provided in each of the handling mechanisms A to present the cards one at a time in proper position for the taking of such impulses. This means for presenting the cards preferably comprises a hollow head 17 which is formed integrally with a hollow shaft 14 which is rotatably and slidably mounted in bearings 71 formed in vertical frame members 72. The frame members 72 are connected by longitudinal braces 131, 132. The hollow head 17 preferably comprises three radially extending portions equi-angularly spaced forming chambers 17ª (Fig. 4) separated from each other by webs 286 extending radially inward to the shaft 14. A register block 18 (Fig. 4) is mounted in the vertical frame member 72 and forms a definite sensing station at which the cards may be positioned for the purpose of counting the votes marked thereon. This block 18 is located so that when one of the radial portions of the head 17 is in a vertical position, the outer end thereof will be opposite the register block or station 18. The outer end of each of the radial portions of the head 17 is formed so as to extend axially of the shaft 14 and the ends of all of the radial portions are arranged so as to lie in a plane perpendicular to the shaft 14.

The ends of each of the radial portions forms a flat card face 127 upon which a vote card 1 may be positioned and means is provided for holding a vote card on the card face 127. This means preferably comprises a pair of passageways 102 (Figs. 4 and 8) within each of the chambers 17ᵃ and the card head 17 and having their open ends positioned flush with the card faces 127 so that when they are connected to a source of suction or vacuum, the vote card will be drawn firmly against the card face 127.

When one of the card faces 127 is alined with the sensing block or station 18, the other two are positioned in alinement respectively with a supply tray 300 and a storage tray 301. In order to insure proper positioning of the vote cards 1 in the supply tray 300, a round corner 356ᵃ is provided in the lower corner of the tray 300 to receive a correspondingly round corner 356 formed on each of the vote cards 1. Thus if a card is incorrectly positioned in the tray it will project upwardly from the other cards and will be readily noticed by the operator. I also provide a downwardly sloping cam member 293 (Fig. 12) on the top of the tray 300 which engages the tops of the cards 1 as they are fed outwardly of the tray 300, and serves to press them downwardly into proper position.

The card head 17 is connected to the actuating and controlling shaft 5 (Figs. 1 and 2) by means of a shaft 8 horizontally journalled in the frame 22 and continuously driven by the shaft 5 through bevel gears 6 and 7. The shaft 8 is geared to the hollow shaft 14 by means of gears 9 and 10 (Fig. 36) which transmit intermittent or step by step motion to the hollow shaft 14. Thus in the present instance the hollow shaft 14 is turned through one third of a revolution for each revolution of the shaft 8 and each of the card faces 127 is moved progressively step by step from the supply tray 300 to the block 18 and then to the storage tray 301.

Means is provided for connecting the passageways 102 of a particular card face 127 to a source of suction during a portion of the revolution of the head 17 so that when the card face 127 is positioned in alinement with the supply tray 300 a vote card 1 will be taken therefrom and carried on the card face 127 during the next one-third revolution of the head 17 into alinement with the register block or station 18. During the next one third revolution of the head 17, the card is similarly held in place on the card face 127 so that it is moved into alinement with the storage tray 301. At this point, the passage-ways 102 of the particular card face 127 are cut off from the low pressure source.

In the form shown herein this suction source comprises a pump 136 (Fig. 1ᵃ) connected to the hollow shaft 14 by means of a member 135 which slidably embraces the end of the shaft 14. Apertures 103 are formed in the hollow shaft so that passage-ways 102 may be connected to the lower pressure source as above described and to open and close the apertures 103 a valve member 104 (Figs. 1ᵃ, 29, 30, 31 and 32) is provided which is tubular in form and is slidably positioned within the hollow shaft 14.

The valve 104 which is shown in detail in Figs. 29 to 32 is fixed on a slidable non-rotatable rod 51 extending longitudinally within the hollow shaft 14. The rod 51 connected at one end to a slide block 34 mounted in the frame 22 of actuating device B and the slide and the rod 51 are caused to reciprocate by means of a follower 28 on the slide engaging a cam slot 365 formed in the upper surface of a cam disk 24 which is mounted on and rotates with the control shaft 5.

Figures 18, 19, 20, 25, 26, 27, 28, 29, 30, 31, 32:
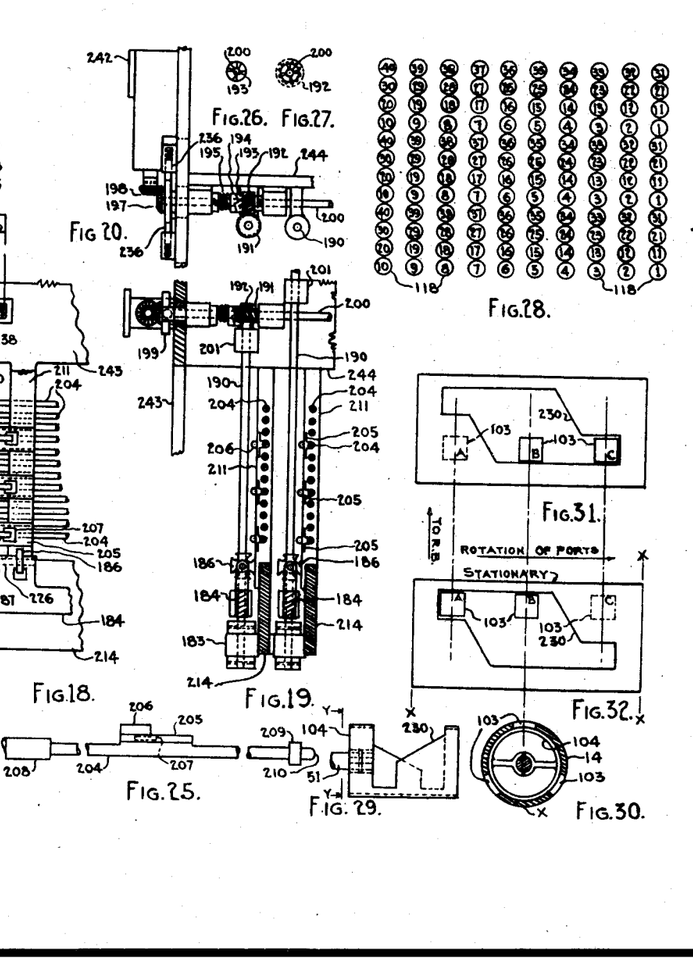
Fig. 18 is an elevational view partially in section of the pistons and the control mechanisms of the counting device.
Fig. 19 is an end elevational view of the mechanism shown in Fig. 18.
Fig. 20 is a plan view of the mechanism shown in Figs. 18 and 19.
Fig. 25 is a detail view of the pistons used in the control device which is associated with the counting mechanisms.
Figs. 26 and 27 are detail views of the clutch mechanism used in the counting mechanism.
Fig. 28 is a diagrammatic view showing the arrangement of the device 118 and the cylinders 217.
Figs. 29 to 32 are detail views of the valve 104.

The valve 104 has a valve opening 230 formed therein of the shape shown in Figs. 31 and 32 so that when one of the card faces 127 is about to take a vote card from the supply tray 300, the port 103 for that card face 127 will be positioned as shown in dotted outline at A in Fig. 31. The valve 104 is then moved by the cam 24 to the position shown in Fig. 32 so that the port 103 indicated at A will be opened and the vacuum will cause a vote card to be taken from the tray 300. It will be noted that the port indicated at C in Fig. 32 is closed at this time so that the vote card carried by the card face 127 associated therewith is released and is deposited in the storage tray 301. When the head 17 is again rotated through one-third of a revolution, the valve 104 is moved (upwardly in Figs. 31 and 32) from the position shown in Fig. 32 back to the position shown in Fig. 31 so that the port 103 which is advancing from position B will be kept continuously open until it registers with portion 232 of the valve opening 230. Thus the card 1 on the card face 127 will be retained in position until the valve is again reciprocated as above described.

In order to provide for the proper positioning of the vote cards 1 on the card faces 127, for the taking of cards 1 from the supply tray 300 and for depositing the cards in the storage tray 301, means is provided for imparting a definite reciprocatory movement to the card head 17 at the end of each advancing rotary movement thereof. In the preferred form this means comprises a slide 35 mounted on the frame 22 and connected by a follower 29 to a cam slot 366 formed in the lower surface of the cam disk 24. The cam disk 24 is shown in detail in Fig. 33. The slide 35 is connected to the hollow shaft 14 by means of an upstanding bracket 37 surrounding the shaft intermediate two spaced collars 30, 31 which may also serve as glands to permit relative sliding movement between the rod 51 and the shaft 14.

Figures 10, 12, 15, 17:
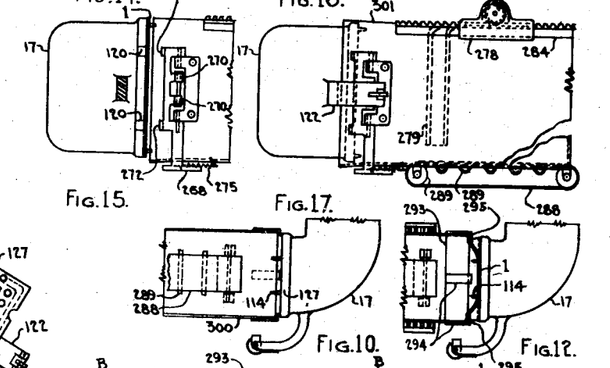
Figure 11:
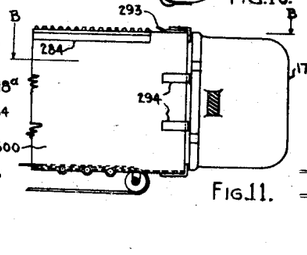
Figure 13:
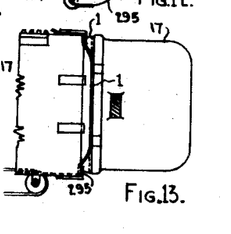

The cam slot 366 is so arranged that when the card head 17 is moved away from the block 18, a vote card 1 is withdrawn from the supply tray 300 by the particular card face 127 which is alined therewith. To insure that only one card will be withdrawn, a plurality of lugs 294, 295 are positioned on the tray 300 so as to project inwardly of the end opening thereof, so that when the first vote card 1 is held on the card face 127 by the suction in passage-ways 102, the edges of the card will be bent as shown in Figs. 12 and 13. In the preferred form the lugs 295 are positioned at the top and bottom of the tray while the lugs 294 are at the sides thereof and the lugs 294 are made of less length so that the side edge of the card will be released first. During the movement of the succeeding card face 127 toward the tray 300, pins 114 mounted on the card face enter the holes 353 in the vote card 1, thus properly positioning the card on the card face.

After a vote card 1 has been taken from the supply tray 300 it is moved to the block 18 and from there to the storage tray 301 and to insure that the card will be deposited in the tray 301, positive gripping means is provided which is preferably operated by the axial movement of the card head 17, to engage the edges of the vote card 1. To permit the card face 127 to come into close contact with the block 18, apertures 115 are formed in the block to receive the pins 114.

Figures 9, 14:
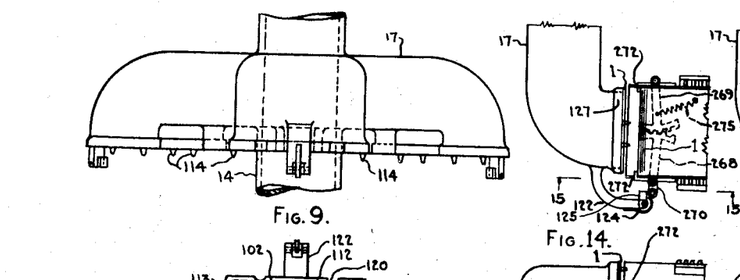
Fig. 9 is a plan view of the card handling member 17 shown in Fig. 8.
Figs. 10 to 17 are detail views showing the various positions of the card handling member 17 relative to the compartments in which the cards or ballots are stored.
Figure 16:
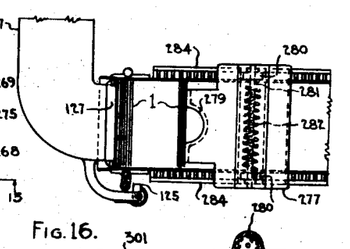

The positive gripping means, above mentioned, is preferably of the character shown in detail in Figs. 14 to 16 and comprises a pair of hook members 272 pivotally secured on the opposite sides of the tray 301 so as to project inwardly of the end opening thereof. The hooks 272 are arranged to pivot simultaneously out of said end opening to permit the entrance of a vote card 1 into the tray 301, this simultaneous pivoting being caused by levers 268 and 269 attached to the opposite hooks 272 and geared together beneath the tray. The hooks are normally maintained in position across the end of the tray by means of a spring 275 attached to one of the levers 269.

The means for pivoting the hooks 272 preferably comprises a plurality of arms 122 (Fig. 14) fixed on the head 17, one adjacent each card face 127, each arm 122 having a pivoted lug 125 thereon arranged so as to contact and move an arm during the movement of the head toward the tray 301. The arm 270 is fixed to one of the hooks 272 so that movement of the arm moves the hooks 272 out of the path of the vote card which is being carried toward the storage tray 301 by the card face 127. When the vote card 1 has been moved beyond the hooks 272, the lug 125 passes beyond the end of the arm 270, thus allowing the hooks 272 to swing inwardly so as to retain the card in the tray 301. During the movement of the card face away from the tray, the lug 125 pivots against the force of a spring 124 and thus passes the arm 270 without disturbing the hooks 272.

To permit positioning of the hooks 272 behind the vote card 1 at the card face 127, a plurality of grooves 120 are formed in the card head 17 on the sides of the card faces 127 into which the hooks 272 may project.

Means is preferably provided for maintaining the vote cards 1 in closely packed upright position in the trays 300 and 301 and in the preferred form shown in Figs. 16 and 17 this means comprises a carriage 277 mounted on top of each tray and movable longitudinally of the tray by a spring device 282 which rotates pinions 280 which are mounted on a transverse shaft 281 and which engage racks 284 along the top edges of the tray. Arms 278 extend downwardly from the carriage 277 to engage the face of the end card. A movable belt 288 mounted on rollers 287 and 289 may be provided to enable the cards to be more easily moved by the carriage 277.

It will be noted that the reciprocatory movement of the card head 17, as herein disclosed, is of a positive nature, and to insure a firm clamping of the vote cards between the card face 127 and the block 18, means is preferably provided for applying a yielding force to the block 18 to urge it toward the card face 127. To this end the block 18 is mounted in the frame 72 for sliding movement limited by lugs 69 and 70 (Fig. 1) said movement being parallel to the shaft 14 and a rod 64 is slidably mounted in the frames 72 for applying such a yielding force to the block 18 in each of the handling mechanisms A.

The sliding rod 64 as shown herein, is moved toward the card face 127 by the control device device B immediately after the card face has been moved toward and into close proximity to the block 18 by the reciprocatory movement of the shaft 14. This is accomplished by a lever 57 pivotally mounted at 63 on the frame 22 and pivoted at 65 to the lever 64. The lower end of the lever 57 is pivoted at 58 to a rod 52 which is reciprocated in the frame 22 by a slide block 38 having a follower 28 which engages a cam slot 367 formed in the upper surface of a cam disk 25 mounted on the control shaft 5. To reduce the wear on the cam groove 367, a spring 59 may be interposed between a washer 60 fixed on the rod 52 and the side of the frame 22.

The rod 64 yieldingly engages each of the blocks 18 by means of arms 67, one arm 67 extending downwardly from each rod 64 so as to connect with the related end face of each block 18. Preferably, springs 68 are interposed between the arms 67 and the blocks.

To identify those ballots which have been presented to the register block, a stamping device 119 is positioned on the block 18 so that the ballots will be pressed against it by the card faces 127.

*Transmission of actuating power impulses to counters*

Means is provided which is operable while a vote card 1 is positioned between the card face 127 and the block 18 to transmit actuating power impulses to a plurality of individual counters in accordance with the physical indicia placed on the ballot by the voter. In the preferred form illustrated herein these actuating power impulses are transmitted from the ballot handling mechanisms A to the counting mechanism C by means of air pressure and a suitable source of air pressure is provided at 134 connected by a pipe 133 to the several ballot handling stations A.

The air pressure is communicated at the proper time to the interior of the chamber 17$^a$ which happens to be adjacent to the block 18 and in order that pressure air may pass from the chamber 17$^a$ through the apertures formed in the vote cards 1 by the voter, a plurality of bores 111 (Fig. 5) are formed in the block 18, each bore 111 being connected to a counter by means of a tube 118. In order to provide a tight connection about each aperture in the vote card 1, an annular recess 110 is formed (Figs. 6 and 7) about the passage 112 in the card head 17 and the vote card is pressed into this recess by a complementary annular bead 109 formed on the block 18 about each bore 111.

Thus it will be apparent that a blast of pressure air may pass from the chamber 17$^a$ through each aperture which has been formed in the ballot by the voter and that this blast of pressure air may be communicated to a suitable counting mechanism by the tube 118.

To communicate the air pressure from the pipe 133 to the chamber 17$^a$ at the proper time, a control device is provided operatively associated with main control shaft 5, which device preferably comprises a valve mechanism having a valve chamber 86 (Figs. 4 and 5) mounted on the frame 72 and interposed in controlling relation between the pipe 133 and a pipe 82 which leads to the chamber 17$^a$. A valve member 89 is fixed on a slidably mounted horizontal stem 91 so as to be movable by said stem into contact with a valve seat 87 to prevent passage of pressure air to the chamber 17ª.

The valve 89 is moved to and from its closed position by a rod 54 slidably mounted in the frames 72 parallel to the shaft 14 and operatively connected to the valve rod 91 by an arm 95 which embraces the rod between two fixed washers 93.

The valve control rod 54 is reciprocated in proper timed relation to the other parts of the machine by means of a pivoted connection with a slide 40 mounted in the frame 22 and reciprocated by a follower 28 which rides in a cam groove 369 formed in the upper surface of a cam disk 26 (Fig. 35) mounted on the control shaft 5.

To permit of successive connection of the different chambers 17ª with the source of pressure air, the pipe 82 leads to a sleeve 80 mounted in the frame 72 above and parallel to the shaft 14 so as to project beyond the face of the frame toward the card head 17. A plurality of bores 126 are formed in the head 17, one communicating with each of the chambers 17ª and these bores are so positioned that when the head 17 is moved longitudinally toward the register block 18, the bore 126 of the upper chamber 17ª will slide over the sleeve 80 and thus form a connection through which pressure air may be communicated to the chamber 17ª.

The safety device

To guard against the introduction of error into counters due to improper positioning of the vote card on the register block, or due to the lack of a vote card to be counted, means is provided to prevent the passage of pressure air to the chamber 17ª when the handling device A fails to supply a card or fails to properly position a card. This means is preferably operated by pressure air and is controlled by the control device B. To this end a second pipe 83 is connected to the valve chamber 86 and a valve 89ª is operated in proper timed relation to the other parts by means of a slide rod 53 mounted in the frames 72 and operatively connected by a slide 39 having a follower 28 riding in a cam groove 368 formed in the lower surface of a cam disk 25 (Figs. 1 and 34).

The pipe 83 is connected successively to passages 101 positioned within the chamber 17ª, this connection being accomplished by a projecting sleeve 81 similar to the sleeve 80. The end 117 of each passage 101 is located at the card face 127 of its particular chamber 17ª so as to register with an aperture 116 formed in the sensing block 18 in such a position that it will be covered and closed by a vote card properly positioned on the block 18. Thus if a card is not in position between the block 18 and the card face 127, air pressure may be communicated from the passage 101 to the aperture 116 and this aperture is connected by means of a pipe 73 (Fig. 4) to a valve device mounted in the frame 72. This valve device comprises a valve member 76 slidably mounted in a chamber 79 formed at the end of the pipe 82, said valve member being movable to prevent passage of air to the chamber 17ª. The valve 76 is normally held in open position by a spring 77 mounted in a bore 371 in the frame and is arranged to be closed by the passage of pressure air through the pipe 73, this pipe being connected to the bore 371 so as to impinge upon a piston 75 mounted on the valve member 76.

The safety control valve 89ª is arranged to be opened by its controlling cam groove 368 just before the opening of the valve 89, and it will be apparent that in case a card is not in place on the block 18 so as to cover the aperture 116, the pressure air will pass through the aperture to actuate the valve 76 and close the passage to the chamber 17ª. Thus when the valve 89 is opened the pressure air cannot pass to the chamber 17ª and hence an error cannot be introduced into the counters.

Ballot counting means

Means is preferably provided for registering the number of ballots from which votes have been counted. In the present form this means comprises a counter 99 (Fig. 4) mounted on each frame 72 and connected by an arm 98 to a piston 97 slidably mounted in a bore 97ª in the frame 72. The bore 97ª communicates with the passage 82 by means of an opening 130 formed therein between the valve chamber 79 and the sleeve 80. Thus if the valve 76 is closed, the pressure air will not reach the opening 130 and the counter 99 will not be actuated. A spring 100 is provided to return the counter and the piston 97 to initial position after actuation.

A second passage 296 (Fig. 5) is formed in the frame 72, similar to the passage 97ª, and is connected to the passage 82 so as to receive air pressure each time pressure is introduced into the upper chamber 17ª. The passage 296 communicates with a second passage 297 controlled by a valve 365ª and the passage 297 is connected with a sleeve 180 similar to the sleeve 80 arranged to enter the bore 126 of the chamber 17ª which is positioned at the storage tray 301. Thus a part of the pressure from the upper chamber 17ª will be utilized to force the vote card 1 from the card face 127 into the storage tray 301.

The counting mechanism

Because of the fact that a plurality of ballot handling devices are employed, from each of which power impulses may be transmitted to the single counter which is provided for each candidate, I preferably employ a counting mechanism of the type in which a control mechanism is set by an initial operation and the numbers introduced into the counters by a second operation, the counters being actuated in accordance with the setting of the control mechanism.

Thus a plurality of control mechanisms may be provided for each counter, one of such control mechanisms for each ballot handling device A, and after the control mechanisms have been set by the power impulses communicated from the device A, the mechanism may be actuated to add the votes set on all of the control mechanisms into the counters. In the present instance these control mechanisms are arranged to be actuated from their inoperative to their operative positions by the compressed air impulses which pass from the register block or station 18 through the flexible tubes 118.

Figure 1A:
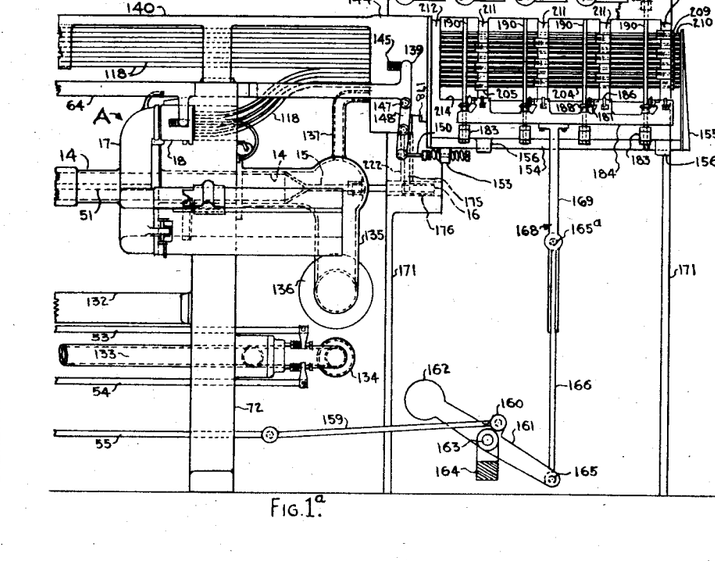

To this end the tubes 118 from all of the handling mechanisms A are carried by a frame 140 (Figs. 1 and 1a) and extend to a cylinder block 144 mounted on the frame 72 adjacent the counting mechanism C. The cylinder block 144 has a plurality of separate cylinders 217 (Fig. 18) formed therein and each cylinder is connected at 216 to one of the tubes 118. The cylinders 217 extend through the cylinder block 144 and a piston 208 is slidably positioned in each of the cylinders so as to be forced longitudinally outwardly of the cylinder when air pressure is communicated thereto through its tube 118.

Each of the pistons 208 is connected to a rod 204, and these rods are slidably supported in a plurality of vertical frame members 211.

Each of the rods 204 has a projection 206 formed thereon which is adapted, when properly positioned, to engage a gear wheel 186 which is mounted so that it may be moved past one of the positions of the projection 205. The rods 204 are held against rotation by means of longitudinal flat portions 205 formed thereon which abut suitable recesses in the vertical frame members 211. As shown in Figs. 18 and 19 the gear wheel 186 is mounted on a rotatable shaft 226 in a vertically movable frame member 184. One end of the shaft 226 has a bevel gear 187 fixed thereon in mesh with a bevel gear 188 which is slidably but non-rotatably secured on the vertical rod 190. The rods 190 are mounted in upper bearings 201 formed on a frame member 144 and by lower bearings 183 carried by cross bars 214 connecting the bottom ends of the vertical frame members 211. In its sliding movement along the vertical rod 190, the bevel gear 188 is carried by the frame member 184 upon which it is rotatably mounted.

Figure 3:
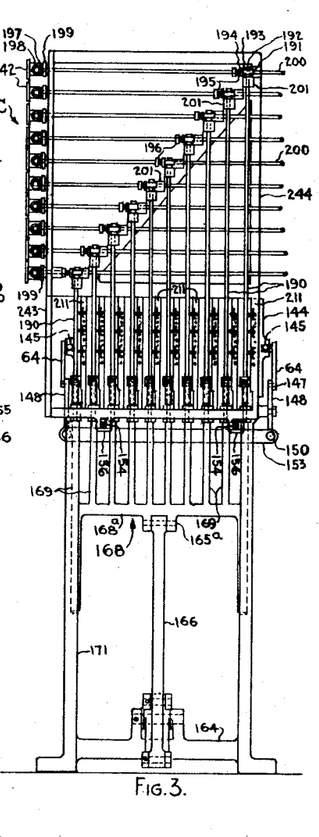
Fig. 3 is an end elevational view of the machine shown in Figs. 1 and 2.
Figure 3A:
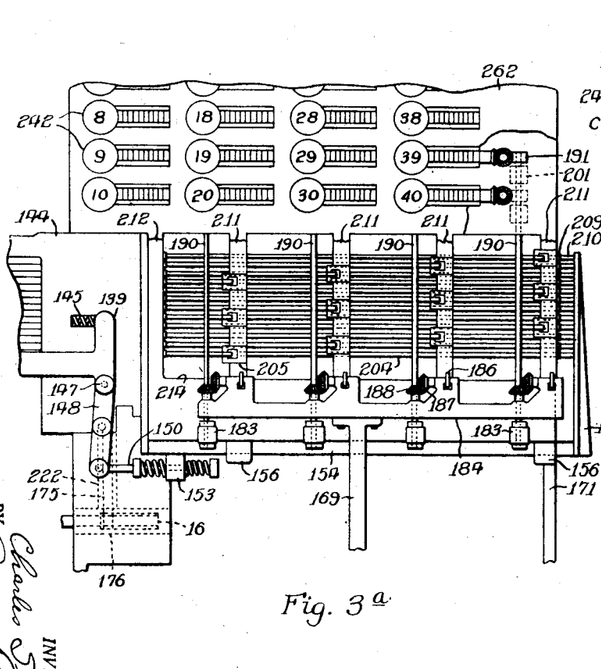
Figure 3B:
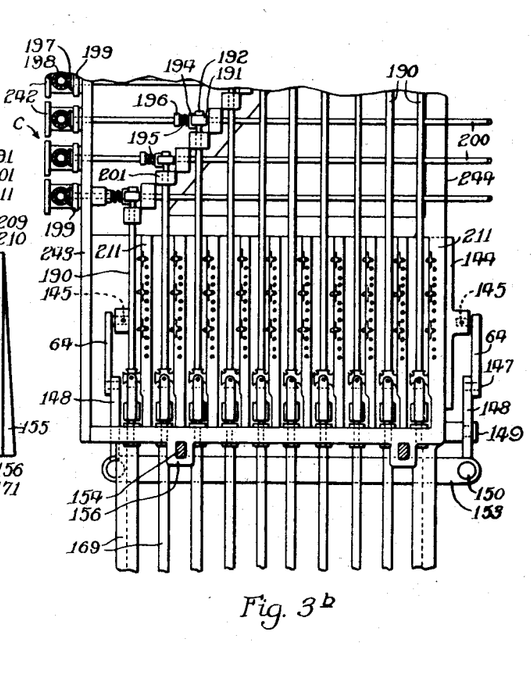

As shown in Fig. 3, each of the shafts 190 extends upwardly and is arranged to transmit its rotary motion to a particular horizontal shaft 200, a plurality of shafts 200 being provided, one for each shaft 190. The shafts 200 are supported by the frame member 244. The shafts 200 are rotated by means of spiral gears 191, 192, and a one-way clutch member 195 so interposed that rotative movement in one direction only may be transmitted to the counters.

The details of the connection between the shafts 190 and 200 are shown in Figs. 19, 20, 26 and 27. The spiral gear 192 is rotatably mounted on the shaft 200 and has a clutch member 193 formed integrally therewith. This clutch member 193 is adapted to engage with a clutch member 194 which is mounted for rotation with the shaft 200 and which is pressed into engagement with the clutch member 193 by a spring 195. The counter 242 is connected to the clutch member 194 through bevel gears 197, 198.

The use of such a one-way clutch device makes it possible to use the same counting mechanism for a number of groups of handling mechanisms such as are described herein. Thus in Fig. 3 I have shown the shafts 200 continuing to the right or transversely beyond the side of the frame 171 so that they may be connected by means of similar one-way clutch devices to another series of vertical shafts 190 which would, of course, be operated between the periods of operation of the shafts 190 illustrated herein.

The counters 242 are mounted on a panel 243 and are connected to the horizontal shafts 200.

The projections 206 are so positioned on the slide 204 that when a rod is moved by the piston 208 the projection 206 will be moved to a position which lies in the vertical path of the gear wheel 186. The slide rods 204 for corresponding spaces on the different register blocks 18 are arranged in the same vertical tier and when any of these rods for corresponding spaces have been actuated, all of the projections 206 of the actuated rods will lie in the path of the gear wheel 186 so that the counter 242 connected to the particular gear wheel 186 will be actuated once for each of these projections 206 which have been moved.

The gear wheel 186 (Figs. 23 and 24) is of the type which is turned one quarter turn for each projection encountered and intermediate these projections the straight side edges 228 of the gear are arranged to travel along the edge of the support 211 so as to prevent turning of the gear. To permit turning of the gear when it encounters the projection 206 the portion 205 is recessed as at 207 so that the corners may project into such recesses during the turning movement of the gear.

As shown in Figs. 1ª and 3, a plurality of frames 184 are provided, one of these frames being positioned between each row of supports 211 and each of the frames carrying a plurality of gears 186 and means is provided whereby all of these frames 184 may be moved upwardly between the supports 211 past all of the slide rods 204. In the present instance this means comprises a frame 168 mounted for vertical sliding movement in the frame 171 and having a cross bar 168ª. A plurality of upwardly projecting members 169 are positioned in the cross bar 168ª and one of the frames 184 is mounted on the top of each one of the members 169.

Means is provided for moving the frame 168 upwardly in proper timed relation and this means is preferably associated with the main control shaft 5. In the present instance it comprises a lever centrally pivoted at 163 on a cross bar 164 near the bottom of the frame. The lower end of a link 166 is pivotally connected at 165 to one end of the lever 161 and the upper end of the link is pivoted to the frame 168 to 165ª. A counterbalancing weight 162 is positioned at the other end of the lever 161. To pivot the lever 161 and thus raise the frame 168, an upwardly projecting arm 160 is formed on the lever 161 and this arm is connected by means of a link 159 to a slide bar 55, this slide bar being connected by means of a slide 41 (Fig. 1) and a follower 28 to a cam groove 370 formed in the cam disk 26. The cam slot 370 is shown in detail in Fig. 35 and is arranged so that the frame 168 will be raised to its elevated position immediately after the slide rods 204 have been actuated by the compressed air blasts from the registration block 18, thus causing the gears 186 to be turned for each piston rod 204 which has been moved.

In order that the gears 186 may not be rotated in the reverse direction during the downward movement of the frames 184, means is provided for returning the slide rods 204 to their normal or inoperative position while the frames 184 are in their elevated positions. For this purpose the ends 210 of the slide rods 204 are arranged so as to project beyond the end of the frame 171 and fixed washers 209 are positioned thereon to limit the movement of the bars toward the cylinder block 144. A pair of slide rods 154 are slidably mounted in brackets 156 on the frame parallel to and below the slide rods 204 and a member 155 is mounted on the ends of the slide rods 154 so that when the bars 154 are moved to the left in Fig. 1ª, the member 155 will engage the ends 210 of the slide bars 204 to move them to their inoperative position.

Means is provided for operating the slide rods 154 at the proper time and in the present instance this means comprises a lever 148 pivotally mounted at 149 on the frame 172. The upper end of the lever 148 is pivoted at 147 to the slide bar 64 and at its lower end is pivoted to a link 150. The link 150 is yieldingly connected to a bracket 153 which is connected to the slide bars 154 so that upon movement of the bar 64 to the right in Fig. 1ᵃ, the member 155 will be moved yieldingly against the ends 210 of the rods 204 to move the displaced rods back to their normal inoperative positions.

Thus the counter control mechanism is again ready to receive actuating power impulses from the next series of vote cards which are positioned at the several register blocks or stations 18 by the subsequent movement of the card heads 17 of the ballot handling devices A.

In devices of this character there is a possibility of the various air passages becoming clogged and to avoid this undesirable result, means is preferably provided to draw dust and refuse from the air passage. In the preferred form herein illustrated, this means comprises a plurality of vertical bores 218 (Figs. 18 and 22) formed in the cylinder block 144 and connected to the cylinders 217 by means of transverse bores 264. The vertical bores 218 are connected to each other by a transverse passage 225 which is in turn connected by a pipe 137 to the low pressure source 136 (Fig. 1ᵃ).

Means is provided for controlling the transverse bores 264 so as to open the same only between the periods when it is desired to transmit power impulses to the counters. This means in the present form comprises a plurality of valve sleeves 218ᵃ, one positioned in each of the vertical bores 218. The valve sleeves 218ᵃ having side apertures 223 which may be brought into and out of register with the transverse bores 264 by rotation of the valve sleeves. The valve sleeves 218ᵃ are preferably mounted on shafts 221 which are geared for simultaneous rotation by means of gears 220 and 263. These gears are, in the present instance, actuated by a segment 176 mounted on one of the shafts 221 and which engages a circular rack 16 formed on a rod 15 which is connected to the end of the hollow shaft 14 (see Fig. 1ᵃ) so as to be reciprocated thereby. Thus the source of low pressure 136 will be frequently connected to all of the cylinders 217 and the tubes 118 so as to effectually clean dirt and refuse therefrom.

*An alternative construction*

In Fig. 37 I have shown an alternative construction embodying three means for detecting a mark on a ballot so as to insure actuation of the counting device. These three means may be used singly or in combination as desired.

This structure is shown in connection with a card head 17 having a card face 127 with apertures 112 therein which register with the apertures which may be formed in the vote cards 1. The apertures 112 also register with bores 317 formed in a register block 310, similar to the register block 18. Each bore 317 is connected to a pipe 311, the extreme end of which houses a piston 312. A counting device 331 is provided having a projecting shaft 329 which may be oscillated to actuate the counter and this shaft is operably connected to the piston 312 by means of an arm 328 pivoted at 327 on the piston 312 and sliding diametrically in the shaft 329. Thus when the piston is moved outwardly of the pipe 311 by a blast of air, the counter will be actuated.

A second means is provided for moving the arm 328 to actuate the counter, this second means comprising a plunger 318 slidably mounted in block 310 concentrically with the bore 317 so that the plunger may be moved through an aperture formed in a vote card 1 into contact with a metallic stop device 333 positioned with the chamber 17ᵃ.

The plungers 318 are yieldingly urged toward the stop 333 each time a vote card 1 is positioned on the register block 310. This is accomplished by a member 321 slidingly surrounding all of the plungers and yieldingly connected thereto by a plurality of springs 320, one surrounding each of the plungers between the member 321 and a collar 319 on each plunger. The member 321 may be reciprocated by any preferred means such as my connection to the slide bar 54 shown in Figs. 1 and 2.

The plungers 318 are returned to their initial position by engagement of the member 321 with collars 323 on the plungers during the return movement of the member 321. Each of the plungers 318 is connected to its particular counter by means of a lever 324 pivoted intermediate its ends at 326. One end of the lever has a slotted pivotal connection with the counter operating arm 328 at 327 while the other end has a slotted pivotal connection with the plunger 318 at 325.

A third means is also provided for moving the arm 328 in accordance with the marking of a vote card 1. This means comprises an electromagnet 314 arranged to attract an armature 313 connected to the end of the counter actuating arm 328 in such a manner as to actuate the counter.

The electromagnet 314 is connected by a wire 315 to the plunger 318 and an insulating sleeve 349 provided in the block 310 about the plunger 318. The other circuit of the magnet comprises a wire 316 leading to a suitable source 314ᵃ and a wire 316ᵃ grounded to the block 310. Thus when the plunger 318 touches the metal stop device 333 at 332, the circuit through the magnet 314 is completed so as to actuate the counter 331.

Figure 21:
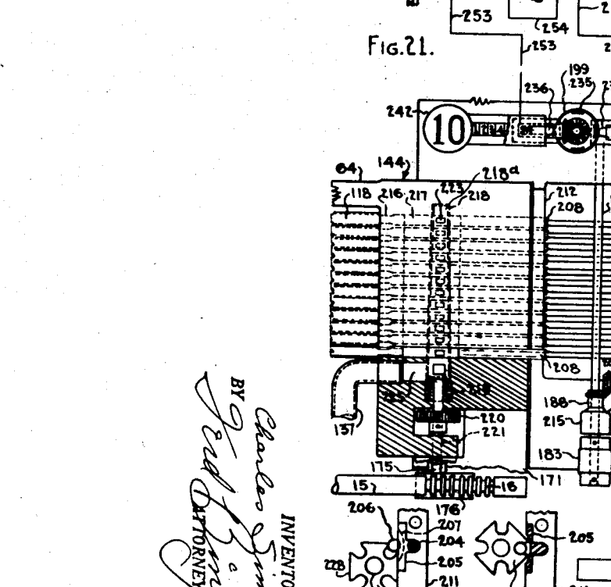
Fig. 21 is an end elevational view partially in section of a remotely positioned registering device which is adapted to be associated with the counting mechanism C.

In Fig. 21 I have shown mechanism whereby the totals accumulated in the counters may be displayed at a point remote from the counting mechanism C. As herein shown, the apparatus is electrically operated and an armature 199 having a plurality of contacts 235 is secured on the shaft 200. Contact brushes 236 are arranged on opposite sides of the armature 199 so that each time a vote is introduced into the counter, an electrical connection will be made between the two contacts 235. Two wires 253 and 255 lead from the opposite contacts 236 to an electrically operated counting mechanism generally designated by the numeral 380. The wire 255 leads to a source of current 258 and a wire 259 leads to a relay switch 260 which is connected by means of a wire 254 to an electromagnet 245 in the counting device 280, the wire 253 leading to the other side of the magnet.

Thus each time the contacts 235 and 236 complete a circuit the electromagnet 245 will be energized. The magnet 245 is arranged to actuate a counter 242 having an operating arm 252. The operating arm 252 is connected by means of a link 249 to one end of an armature 247 which is pivoted at its other end at 248. When the electromagnet 245 is energized, the arm 247 is drawn downwardly to actuate the counter 242.

From the foregoing description it will be apparent that the invention provides means whereby the votes indicated on a ballot by a voter may be entered into a counting mechanism by means which is entirely mechanical and which therefore eliminates the personal element which has heretofore made possible the commission of numerous vote frauds.

It will also be apparent that the invention provides an exceedingly rapid means for determining the results of an election since it provides a number of mechanisms in which ballots may be rapidly handled by efficient mechanical means together with means for introducing the votes marked on the ballots handled at these several mechanisms into a single counting device. It will also be apparent that the machine herein described will serve to count votes much more economically than the system now in use and that due to this low cost, elections may be held more frequently to determine governmental questions.

It is contemplated that a system similar to that used by the United States Post Office Department will be used for the purpose of distributing the ballots to the voters and for collecting the ballots after they have been marked. The economy and dispatch with which these two steps in an election may be accomplished, will readily be apparent to those familiar with the operation of the present postal system and when such a system of distribution and collection of ballots is used in connection with the vote counting machine herein described it will greatly reduce the cost and time necessary to conduct an election.

This application is a division of my copending application Serial No. 295,860, filed July 28, 1928, issued April 23, 1935, as Patent No. 1,998,527.

I claim as my invention:

1. In a vote counting mechanism for counting votes marked on ballots by physical alteration of the ballots, the combination of a plurality of sensing stations each embodying mechanism for handling a succession of ballots one by one, an analyzer at each of said stations for analyzing the marking of the predetermined areas of the ballots at the several sensing stations, a summation mechanism having a plurality of counters, one for each of said areas of the ballots, governing means for said counters controlled by said analyzers, and means operable to actuate the counters and the several sensing stations in timed and coordinated relationship to insure accurate summation by said counters of the votes marked on all the ballots passing through all of said sensing stations.

2. Vote counting apparatus of the character described comprising, in combination, a plurality of sensing stations each having means for handling a succession of ballots one by one, means at each of said stations operable to analyze the votes marked by physical alteration on said ballots, a common summation device for counting the votes marked on the ballots handled at all of said stations, said device having a plurality of counters and a plurality of control elements for each counter, means operatively connecting each of the control elements of each counter to the analyzing means of a different one of said stations, and means synchronizing the operation of said stations, said analyzing means and said counters.

3. A device of the character described comprising a summation mechanism having a plurality of counters and a plurality of shiftable control elements for each counter, each element being adapted in one position to cause the introduction of one unit into its counter, a plurality of sensing stations each adapted to handle simultaneously a different series of ballots one by one, analyzing means operatively associated with said stations and said control elements and governed by the physical alteration of the ballots as they are handled at said stations to actuate the counter-control elements associated with the particular station in accordance with such marking of the ballot, and means acting in timed relation to the operation of said stations to accumulate in said counters the votes thus set up on said control elements.

4. A vote counting machine for counting votes recorded by physical alteration of ballots, said machine comprising in combination, a plurality of sensing blocks at each of which a ballot may be positioned, means for moving a series of ballots to each of said blocks one by one, each series being moved to one of said blocks only, independently operable counter control means for each of said blocks, each control means being governed by the marking of the ballots passing the block with which it is associated, a plurality of counters, each of which is controlled by corresponding counter control means of the several sensing blocks, and means for actuating the counters in accordance with said control means and in timed relation to the operation of said ballot moving means.

5. In an automatic machine for counting votes marked on a ballot by physical alteration of said ballot, the combination of a plurality of devices for handling ballots, each of said devices comprising a sensing station at which ballots may be successively positioned, a single registering mechanism having a plurality of counters one for each proposition or candidate on said ballot, control mechanism for said counters operably connected to all of said devices, means for transmitting actuating power impulses from each of said stations to said control means to set said control means, means to actuate said counters in accordance with the setting of said control means, means for returning said control means to inoperative position, and a power driven cam device for actuating said several means in timed relation to each other.

CHARLES SIMEK.